(12) United States Patent
Tang

(10) Patent No.: US 12,416,312 B1
(45) Date of Patent: Sep. 16, 2025

(54) BRAKING STRUCTURE FOR CENTRIFUGAL FAN

(71) Applicant: ASIA VITAL COMPONENTS CO., LTD., New Taipei (TW)

(72) Inventor: Chih-Cheng Tang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 18/808,440

(22) Filed: Aug. 19, 2024

(30) Foreign Application Priority Data

Aug. 1, 2024 (TW) .................................. 113128782

(51) Int. Cl.
*F04D 29/043* (2006.01)
*F16D 65/16* (2006.01)

(52) U.S. Cl.
CPC ........... *F04D 29/043* (2013.01); *F16D 65/16* (2013.01)

(58) Field of Classification Search
CPC ...... F04D 29/043; F04D 29/05; F04D 29/053; F04D 29/14; F04D 29/143; F04D 29/146; F16D 65/16; H02K 7/10–1085; H02K 23/68; H02K 27/30
See application file for complete search history.

(56) References Cited

U.S. PATENT DOCUMENTS

| | | | | |
|---|---|---|---|---|
| 5,593,294 | A * | 1/1997 | Houghtby | F16D 41/067 417/313 |
| 10,422,347 | B2 * | 9/2019 | Sun | F04D 29/522 |
| 11,933,311 | B2 * | 3/2024 | Tang | F04D 25/0606 |
| 11,936,278 | B2 * | 3/2024 | Tang | H02K 7/14 |
| 2018/0231074 | A1 | 8/2018 | Sun et al. | |
| 2021/0078837 | A1 * | 3/2021 | Sikora | F04D 27/004 |

FOREIGN PATENT DOCUMENTS

| | | |
|---|---|---|
| CN | 110345088 A | 10/2019 |
| CN | 218439850 U | 2/2023 |
| JP | 2015122930 A | 7/2015 |
| TW | M661422 U | 10/2024 |

OTHER PUBLICATIONS

Search Report dated Mar. 12, 2025 issued by Taiwan Intellectual Property Office for counterpart application No. 113128782.

* cited by examiner

*Primary Examiner* — Sang K Kim
(74) *Attorney, Agent, or Firm* — Demian K. Jackson; Jackson IPG PLLC

(57) ABSTRACT

A braking structure for centrifugal fan includes an impeller; a braking base located at a bottom of a shaft barrel of the impeller and provided with pawls; and a braking module pivotally connected to a shaft of the impeller and internally provided with movable hooks and elastic elements. When the impeller rotates forward, the movable hooks are engaged with the elastic elements and retreated in the braking module. When the impeller fails and rotates backward due to a backflow of air, the movable hooks are disengaged from the elastic elements and centrifugally thrown out of the braking module to engage with the pawls and provide a braking effect. When the impeller operates normally again, the movable hooks are pushed by inclined surfaces of the pawls to retreat into the braking module. The braking structure has good compatibility and can be actuated and disenabled repeatedly without power supply.

9 Claims, 7 Drawing Sheets

BRAKING STRUCTURE FOR CENTRIFUGAL FAN

This application claims the priority benefit of Taiwan patent application number 113128782 filed on Aug. 1, 2024, the disclosure of which is hereby incorporated by reference in its entirety.

FIELD OF THE INVENTION

The present invention relates to a centrifugal fan, and more particularly, to a braking structure for centrifugal fan that has good compatibility and can be added to any existing fan design.

BACKGROUND OF THE INVENTION

Following the constant improvement in the scientific and technological field, a lot of electronic products are designed to have a compact and miniaturized configuration. These compact electronic products will produce heat when they operate, and the produced heat should be dissipated from or guided out of the products, lest the products should be overheated and fail to operate normally or have lowered operational efficiency or even become damaged. Therefore, it is necessary to have a heat dissipation device mounted in the electronic products. Among others, a fan is one of the most common heat dissipation devices. The conventional fans usually have the following braking ways:

(1) To brake the fan while it is ON. A metal oxide semiconductor (MOS) on the fan circuit may be controlled using software to normally open, and a magnetic field generated by the operating impeller and a magnetic field generated by a magnetic tape repel each other to produce a resistance.

(2) To brake the fan while it is OFF. The impeller operates inertially to generate an electromotive force to a hardware braking circuit and drive the MOS to normally open, and the magnetic field generated by the operating impeller and the magnetic field generated by a magnetic tape repel each other to produce a resistance.

(3) To control the fan braking mechanism with an electromagnetic valve. The electromagnetic valve is powered directly by the power supply of the fan. When the fan operates normally, the electromagnetic valve is normally open to separate the fan shaft from the braking mechanism. On the other hand, when the fan is OFF, the electromagnetic valve is inactive and the braking mechanism is driven by a spring to engage with the fan shaft to produce a resistance.

No matter which of the above fan braking ways is used, an additional braking circuit must be added to the circuit board of the fan, or a microprocessor with braking mode function must be mounted on the fan to achieve the braking effect. Therefore, the conventional fan braking module requires substantial re-design or modification before it can be used with an existing fan. In other words, the conventional fan braking modules have relatively low compatibility with the existing fan.

It is therefore tried by the inventor to develop a braking structure for centrifugal fan to overcome the shortages in the conventional fan braking modules.

SUMMARY OF THE INVENTION

A primary object of the present invention is to provide a braking structure for centrifugal fan. When a fan with this braking structure is failed, the braking structure can be actuated by a centrifugal force produced by a backflow of air that drives the fan's impeller to rotate backward, such that the fan is braked. On the other hand, when the fan operates normally, the braking function is disabled. Therefore, the braking structure of the present invention can be repeatedly actuated and disabled without the need of supplying electrical power thereto or adding any braking function to the circuit board of the fan.

Another object of the present invention is to provide a modularized braking structure for centrifugal fan, which has good compatibility and can be mounted to the fan at a last step without the need of changing the original way of assembling the fan.

To achieve the above and other objects, the braking structure for centrifugal fan according to the present invention includes a fan unit and a braking unit. The fan unit includes a fan frame having a shaft barrel perpendicularly provided therein and an impeller having a vertically extended shaft. The shaft is located in the shaft barrel with an end pivotally connected to the impeller and another end extended to form a shaft pivotal section. The shaft pivotal section may be in the form of a square key or a flat key without being particularly limited thereto. The braking unit includes a braking base and a braking module. The braking base is located at a bottom of the shaft barrel and is provided with at least one pawl. The braking module includes a through slot for correspondingly engaging with the shaft pivotal section, so that the braking module is pivotally connected to the shaft. The braking module further has at least one movable hook and at least one elastic element received therein. The movable hook is movably projected from or retreated into the braking module and is provided with a hooked portion corresponding to the pawl. The elastic element is pressed against the movable hook to restrict the movable hook to one of the projected and the retreated position relative to the braking module.

According to the present invention, when the impeller is rotating forward, the braking module is brought to rotate forward at the same time, and a locating ball connected to an end of the elastic element, which can be for example a compression spring, is elastically pushed by the elastic element to engage with a retaining recess provided on the movable hook, such that the movable hook is retained to the retreated position in the braking module.

According to the present invention, when the impeller rotates backward, the braking module is brought to rotate backward at the same time, causing the locating ball on the elastic element to separate from the retaining recess on the movable hook, such that the movable hook is allowed to project from the braking module with the hooked portion thereof being engaged with the pawl.

According to the present invention, when the impeller changes from rotating backward to rotating forward again, the movable hook is pushed by an inclined surface of the pawl on the braking base to move back to its originally retreated position in the braking module.

According to the present invention, the through slot on the braking module has a rectangular configuration, such as a square slot or an elongated slot. In a preferred embodiment, the shaft pivotal section is a square key or a flat key. In an operable embodiment, the fan frame is a metal or a plastic case. In another operable embodiment, the shaft barrel is internally provided with an upper and a lower bearing for holding the shaft in the shaft barrel. And, in the present invention, the at least one movable hook is provided in pairs.

According to the technical means adopted by the present invention, a fan braking function can be actuated by logic and kinetic energy in two different directions that comes from a forward rotation of a fan operating normally and a backward rotation of a failed fan induced by a backflow of air. When the fan is failed, a backflow of air would rotate the impeller backward to generate a centrifugal force, which actuates the braking structure of the present invention to provide a braking effect. On the other hand, when the fan operates normally, the braking function is disenabled and the impeller rotates forward to generate a centrifugal force that does not actuate the braking structure. Therefore, the braking function can be actuated and disenabled repeatedly without the need of supplying power to the braking structure, and it is not necessary to add a brake control function to the fan circuit board. In the present invention, the braking structure is modularized, which has good compatibility and is common in use, and can be mounted to a fan at the last step without the need of changing the original way of assembling the fan.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof.

Figure 1A:
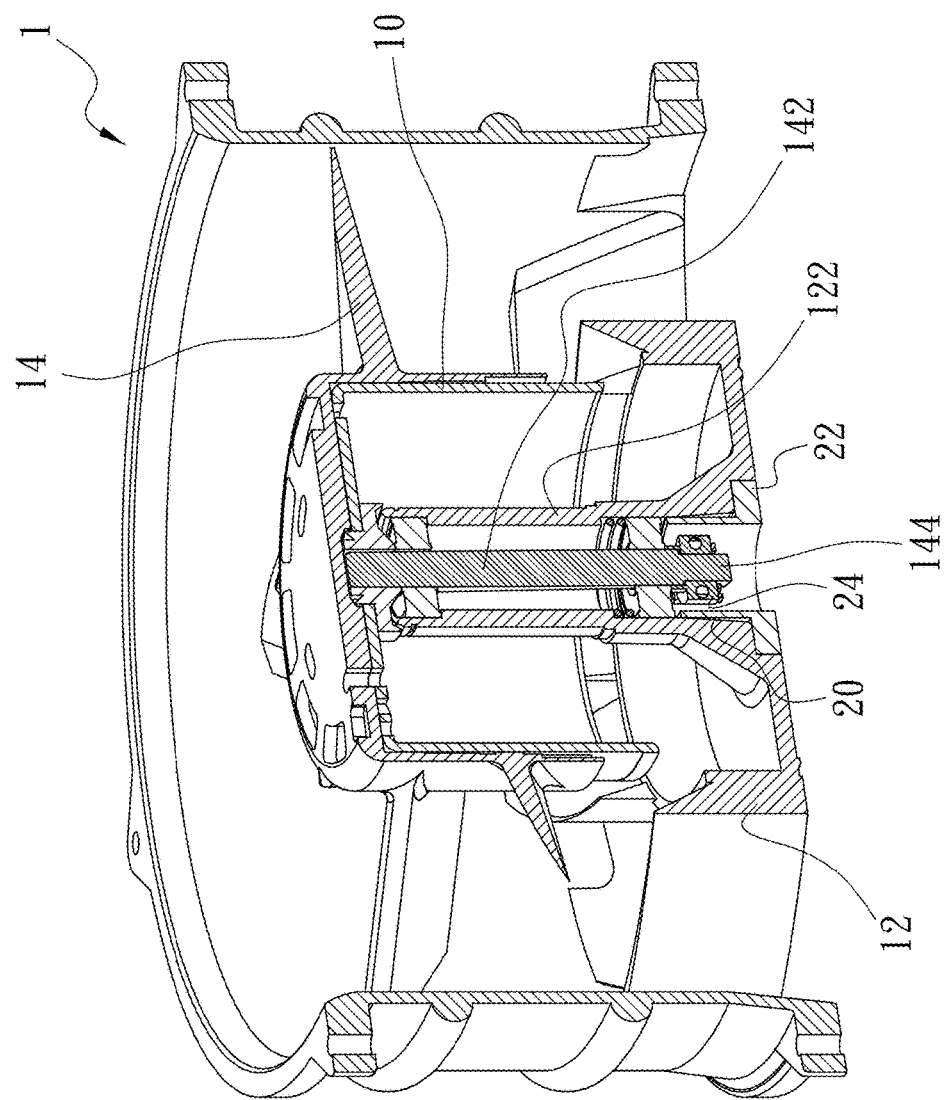
FIG. 1A is a cutaway view of a braking structure for centrifugal fan according to a preferred embodiment of the present invention.
Figure 1B:
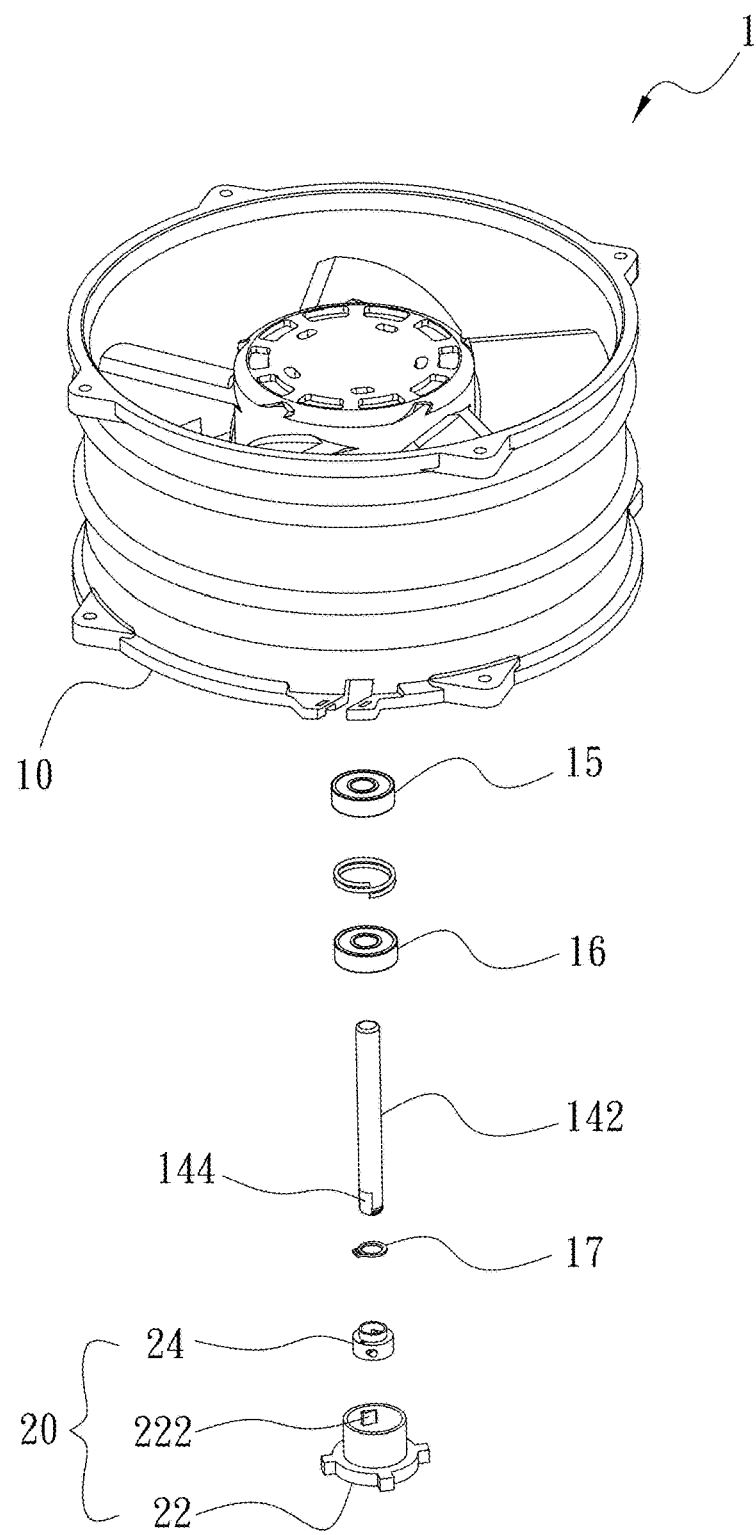
FIG. 1B is an exploded perspective view of FIG. 1A.

FIG. 1A is a phantom view of a braking structure for centrifugal fan according to a preferred embodiment of the present invention, and FIG. 1B is an exploded perspective view of the braking structure of FIG. 1A. For the purpose of conciseness and clarity, the present invention is also briefly referred to as the braking structure and generally denoted by reference numeral 1 herein. Please refer to FIGS. 1A and 1B at the same time. As shown, the braking structure 1 includes a fan unit 10 and a braking unit 20. The fan unit 10 includes a fan frame 12 and an impeller 14. The fan frame 12 can be a case non-restrictively made of, for example, a metal or a plastic material, and includes a shaft barrel 122 perpendicularly located therein. The impeller 14 includes a vertical shaft 142 received in the shaft barrel 122. The shaft 142 has an end pivotally connected to the impeller 14 and another end extended to form a shaft pivotal section 144, which can be but not limited to a square key of a flat key. The braking unit 20 includes a braking base 22 and a braking module 24. The braking base 22 is disposed at a bottom of the shaft barrel 122 and embedded in a bottom of the fan frame 12. The braking base 22 has at least one pawl 222 provided thereon. The shaft barrel 122 is internally provided with an upper and a lower bearing 15, 16 for holding the shaft 12 in the shaft barrel 122. A retaining ring 17 is provided between the braking module 24 and the shaft 142 to hold the braking module 24 to the shaft 142.

Figure 2B:
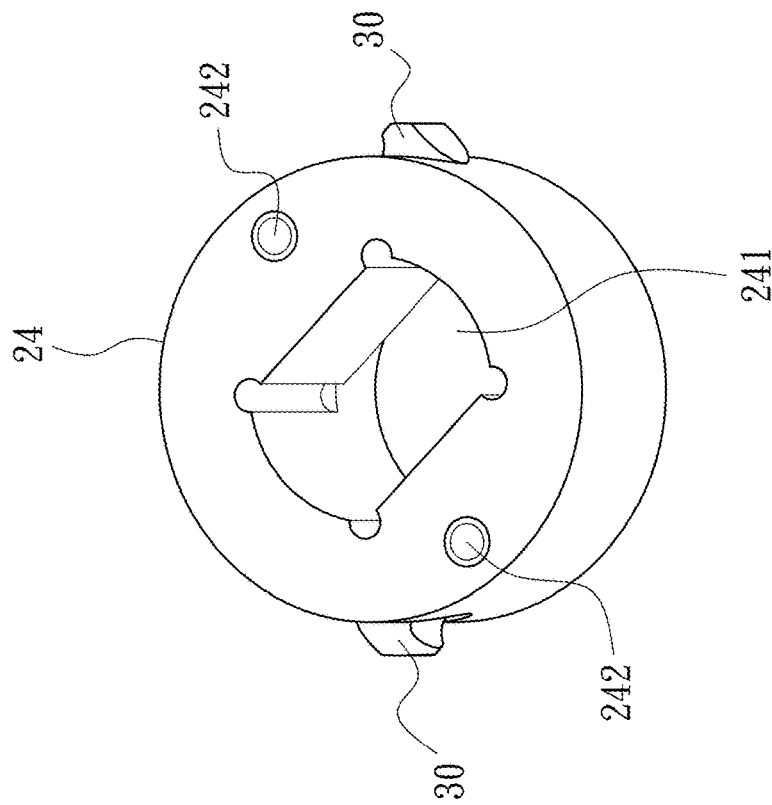
FIG. 2B is a perspective view of the braking module according to the present invention.
Figure 2A:
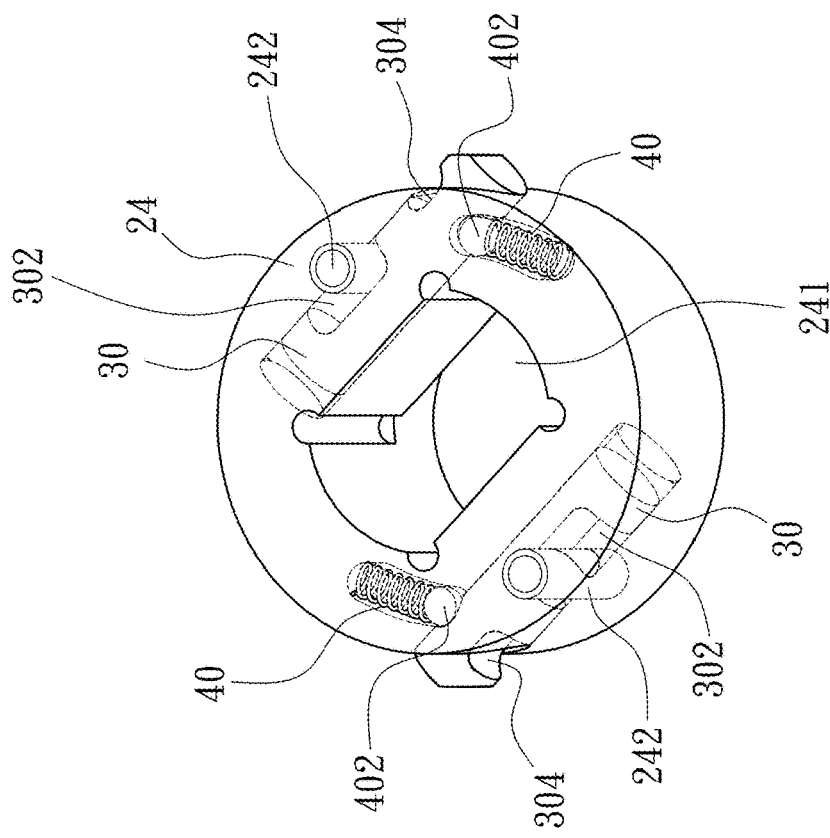
FIG. 2A is an enlarged phantom view of a braking module according to the present invention.

FIG. 2A is a phantom view of the braking module 24, and FIG. 2B is a perspective view of the braking module 24. Please refer to FIGS. 2A and 2B. The braking module 24 includes a through slot 241 for correspondingly receiving the shaft pivotal section 144 therein, so that the braking module 24 is pivotably connected to the shaft 142. The through slot 241 can be, but not limited to, a slot having a square or a rectangular cross section. The braking module 24 is provided with movable locating pins 242, and further internally includes at least one movable hook 30 and at least one elastic element 40. The at least one movable hook 30 is movably projected from or retracted into the braking module 24 and can be, for example, provided in pairs without being particularly limited thereto. The movable hook 30 is provided with a limiting recess 302 corresponding to the locating pin 242. Please refer to FIG. 1B along with FIGS. 2A and 2B. The movable hook 30 has a hooked portion 304 provided thereon corresponding to the pawl 222 on the braking base 22. When the hooked portion 304 and the pawl 222 are engaged with each other, the movable hook 30 is prevented from moving relative to the pawl 222. Please refer back to FIG. 2A. The elastic element 40 in the illustrated preferred embodiment is a compression spring. However, it is understood the present invention is not intended to be limited thereto in any way. The elastic element 40 is pressed against the movable hook 30 and the locating ball 402 disposed at a front end thereof is in contact with the movable hook 30. The elastic element 40, i.e. the compression spring, exerts an elastic push force to limit the movable hook 30 to project from or to retreat into the braking module 24. Since the braking module 24 has a center formed into a square or rectangular through slot 241 and the shaft pivotal section 144 at a lower end of the shaft 142 is formed into a square key or a flat key, the braking module 24 can be moved by a torque of the impeller 14 when the shaft pivotal portion 144 and the through slot 241 are engaged with each other. Further, the torque of the impeller 14 is transmitted to the movable hooks 30 via the locating pins 242 provided on the braking module 24.

Figure 3B:
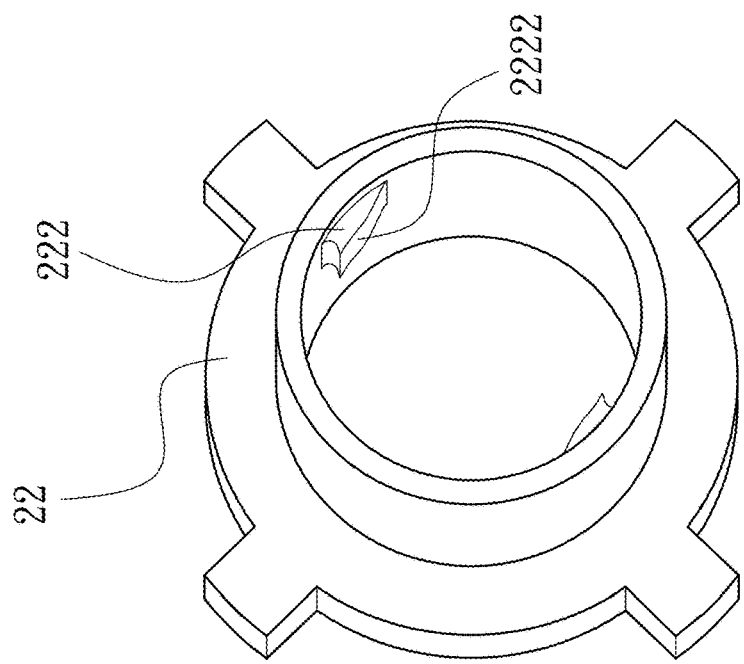
FIG. 3B is a perspective view of the braking base of the present invention.
Figure 3A:
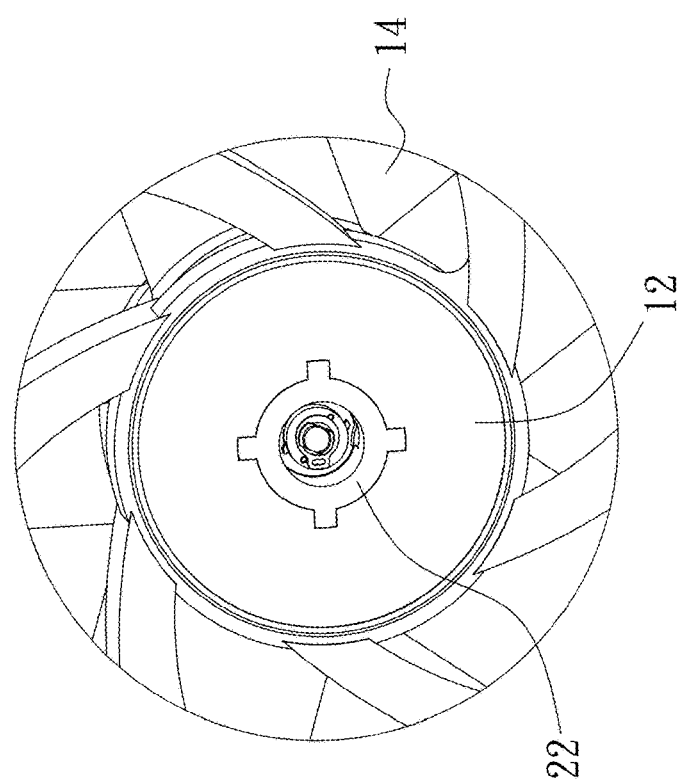
FIG. 3A shows the mounting of a braking base of the present invention on a fan frame.

FIG. 3A shows the braking base 22 is mounted on the fan frame 12 according to the present invention, and FIG. 3B is a perspective view of the braking base 22. Please refer to FIGS. 3A and 3B. The braking base 22 is mounted on the fan frame 12 of the fan unit 10 and is provided on an inner circumferential surface with pawls 222. Each of the pawls 222 includes an inclined surface 2222. When the impeller 14 rotates reversely and then forward again, the movable hooks 30 are pushed by the inclined surface 2222 of the pawls 222 on the braking base 22 to their home position. With the pawls 222, the movable hooks 30 in the braking module 24 being thrown out under a centrifugal force would engage with the pawls 222. Further, the braking base 22 is externally provided with hooks for engaging with recesses (not shown) on the fan frame 12. Therefore, the torque of the impeller 14 is eventually transmitted to the fan frame 12 to achieve the braking function. Some examples of operation of the braking structure of the present invention are described in more detail below.

Figure 4:
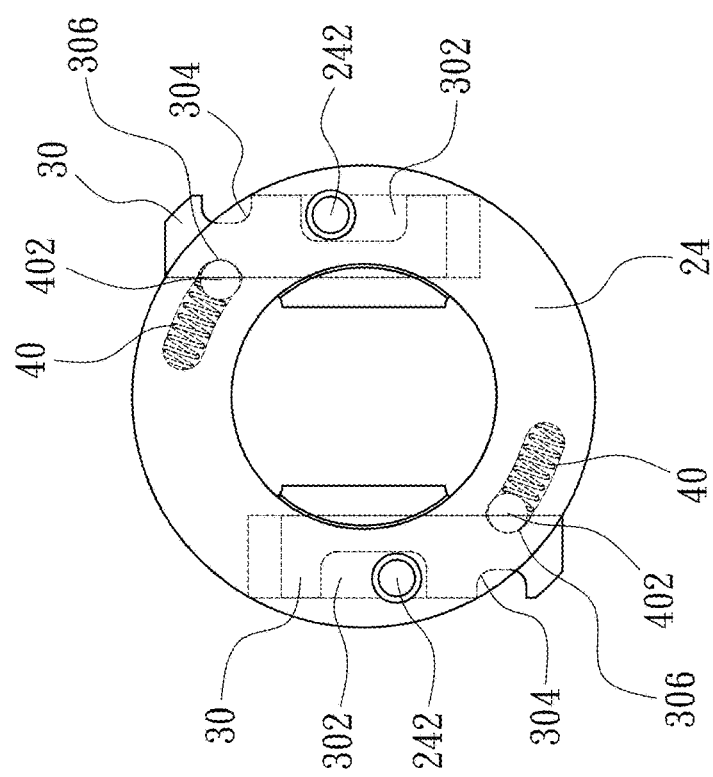
FIG. 4 shows two movable hooks are received in the braking module of the present invention.

In one example, when the impeller 14 operates in a normal condition, as shown in FIG. 4, the movable hooks 30 are received in the braking module 24. Please refer to FIGS. 1A and 1B along with FIG. 4. When the impeller 14 rotates forward, it brings the braking module 24 to rotate forward. At this point, the locating balls 402 on the elastic elements 40, i.e. the compression springs, are elastically pushed to engage with the retaining recesses 306 on the movable hooks 30 and the movable hooks 30 are held by the locating balls 402 to the retreated position in the braking module 24. That is, the locating balls 402 are pushed by the compression springs 40 to engage with the retaining recesses 306 on the movable hooks 30, preventing the movable hooks 30 from being thrown out by the centrifugal fan to actuate the braking function.

Figure 5:
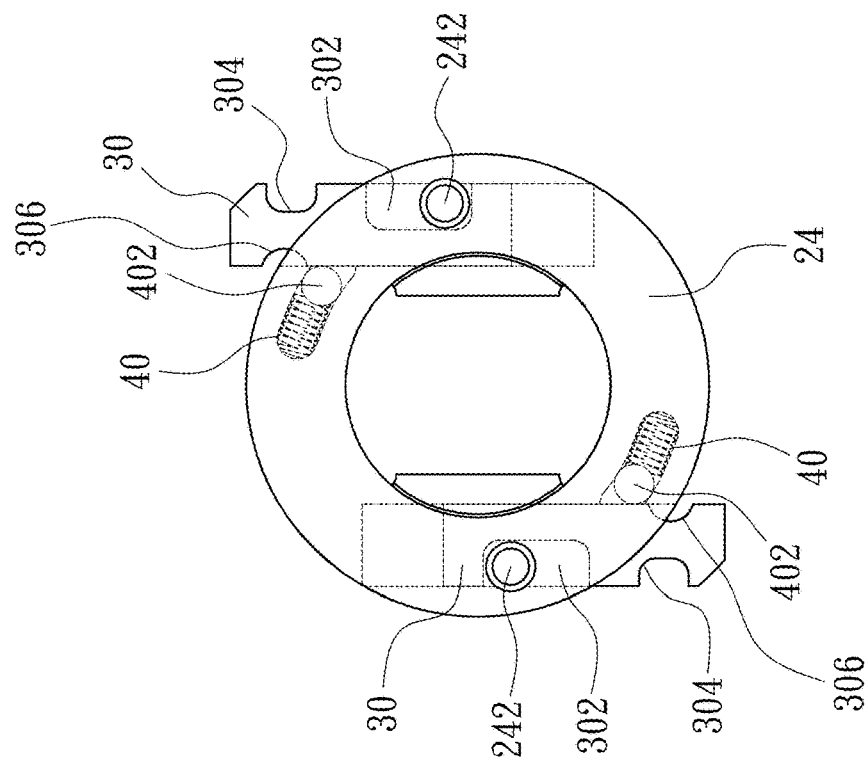
FIG. 5 shows the movable hooks are projected from the braking module of the present invention.

Please refer to FIGS. 1A and 1B along with FIG. 5. In another example, when the impeller 14 is failed and could not operate normally, or when a backflow of air from other fans in normal operation causes the impeller 14 to rotate backward, as shown in FIG. 5, the braking module 24 is brought by the impeller 14 to rotate backward simultaneously. At this point, due to the designed tracking direction of the braking module 24, an inertial force acted on the locating balls 402 is opposite to the push force from the compression spring 40. When the impeller 14 rotates backward at an increasing rotational speed that is high enough to make the inertial force larger than the push force of the compression spring 40, the locating balls 402 would separate from the retaining recesses 306 on the movable hooks 30. At this point, the movable hooks 30 are centrifugally thrown out to engage with the pawls 222 on the braking base 22. Since the braking base 22 is externally provided with hooks for engaging with recesses on the fan frame 12, the torque of the impeller 14 can be eventually transmitted to the fan frame 12 to achieve the braking function. In other words, when the impeller 14 rotates backward, it brings the braking module 24 to rotate backward at the same time, so that the locating balls 402 on the elastic elements 40 separate from the retaining recesses 306 on the movable hooks 30, and the movable hooks 30 can protrude from the braking module 24 for the hooked portions 304 of the movable hooks 30 to engage with the pawls 222 on the braking base 22 to achieve the braking effect.

Figure 6:
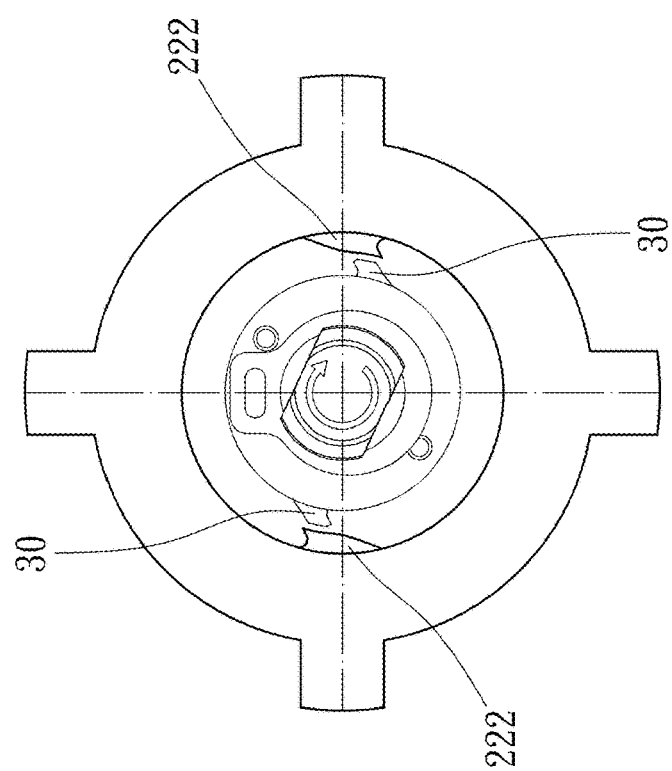
FIG. 6 shows the movable hooks are not in contact with pawls provided on the braking base of the present invention.

FIG. 6 is viewed from a bottom of the fan frame 12, showing the movable hooks 30 and the pawls 222 on the braking base 22 of the braking structure according to the present invention are not in contact with each other. Please refer to FIG. 6 along with FIGS. 1A, 4 and 5. When the impeller 14 rotates forward (i.e. clockwise), the movable hooks 30 received in the braking module 24 are not in contact with the pawls 222 on the braking base 22, and the locating balls 402 are pushed by the elastic elements 40 (i.e. the compression springs) to engage with the retaining recesses 306 on the movable hooks 30, so that the movable hooks 30 are prevented from being centrifugally thrown out to actuate the braking function. Since the braking function is not actuated, the impeller 14 keeps rotating forward.

Figure 7:
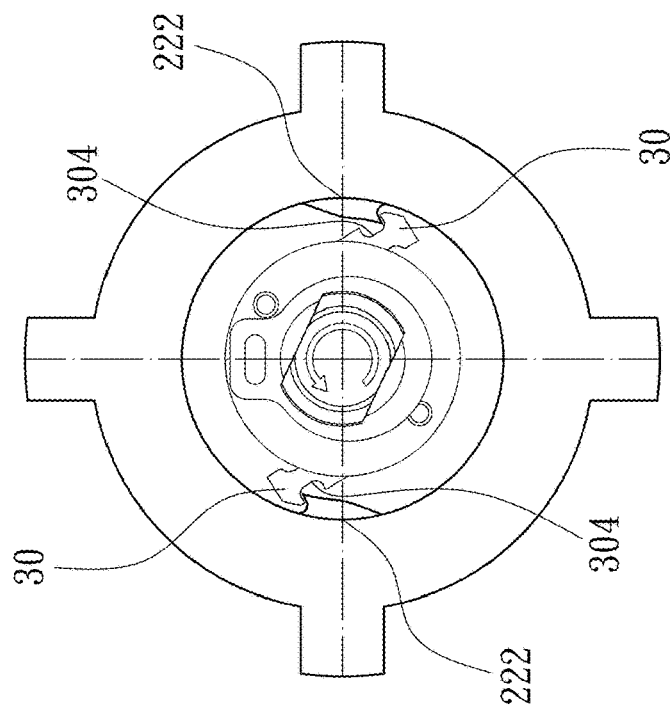
FIG. 7 shows the movable hooks are engaged with the pawls on the braking base of the present invention.

FIG. 7 is viewed from a bottom of the fan frame 12, showing the movable hooks 30 and the pawls 222 on the braking base 22 of the braking structure according to the present invention are engaged with each other. Please refer to FIG. 7 along with FIGS. 1A, 4 and 5. When the impeller 14 is failed and could not operate normally or has stopped rotating but is driven by a backflow of air to rotate backward (i.e. counterclockwise), the impeller 14 rotating counterclockwise would bring the braking module 24 to rotate backward simultaneously. At this point, the locating balls 402 have an inertial force that is opposite to the push force of the elastic element 40 (i.e. the compression spring). When the impeller 14 rotates backward at an increasing rotational speed high enough for the inertial force to be larger than the push force of the elastic elements 40 (i.e. the compression springs), the locating balls 402 will separate from the retaining recesses 306 on the movable hooks 30, and the movable hooks 30 can be thrown out due to a centrifugal force of the impeller 14 to thereby engage with the pawls 222 on the braking base 22. Since the braking base 22 is externally provided with hooks for engaging with recesses on the fan frame 12, the torque of the impeller 14 is eventually transmitted to the fan frame 12 to achieve the braking function. In other words, when the impeller 14 rotates backward, it will bring the braking module 24 to rotate backward at the same time, the locating balls 402 on the elastic elements 40 will separate from the retaining recesses 306 on the movable hooks 30, allowing the movable hooks 30 to project from the braking module 24 with the hooked portions 304 of the movable hooks 30 becoming engaged with the pawls 222 on the braking base 22. Since the braking base 22 is externally provided with hooks for engaging with recesses correspondingly formed on the fan frame 12, the torque of the impeller 14 can be transmitted to the fan frame 12 to produce a braking effect.

Figure 8:
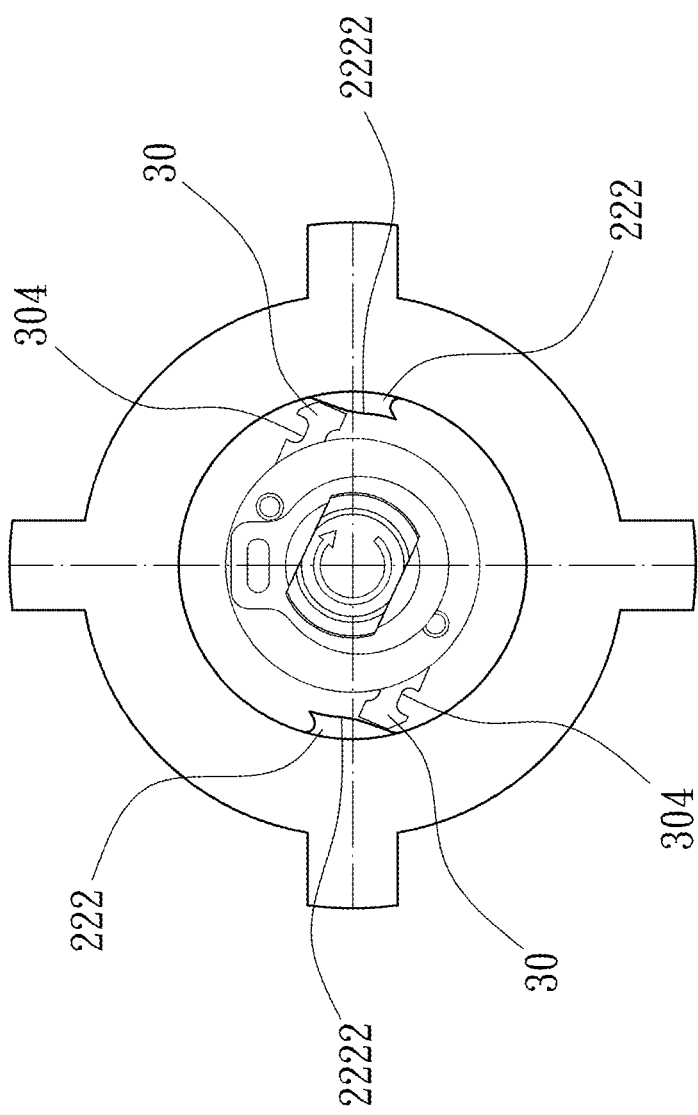
FIG. 8 shows the movable hooks are separated from the pawls on the braking base of the present invention.

FIG. 8 is viewed from a bottom of the fan frame 12, showing the movable hooks 30 and the pawls 222 on the braking base 22 of the braking structure according to the present invention are disengaged from each other. Please refer to FIG. 8 along with FIGS. 1A, 3B, 4, and 5. When the impeller 14 changes from the backward rotating to the normal operation again, the movable hooks 30 slide along the inclined surfaces 2222 on the pawls 222 of the braking base 22 until the hooked portions 304 on the movable hooks 30 are disengaged from the pawls 222.

In the illustrated preferred embodiment, the movable hooks 30 in the braking module 24 of the braking unit 20 are provided in pairs but not necessarily limited thereto. Depending on the number of the movable hooks 30, the pawls 222 and the elastic elements 40 have the same number as the movable hooks 30.

According to the technical means adopted by the present invention, a fan braking function can be actuated by logic and kinetic energy in two different directions that comes from a forward rotation of a fan operating normally and a backward rotation of a failed fan induced by a backflow of air. When the fan is failed, a backflow of air would rotate the impeller backward to generate a centrifugal force, which actuates the braking structure of the present invention to provide a braking effect. On the other hand, when the fan operates normally, the braking function is disenabled and the impeller rotates forward to generate a centrifugal force that does not actuate the braking structure. Therefore, the braking function can be actuated and disenabled repeatedly without the need of supplying power to the braking structure, and it is not necessary to add a brake control function to the fan circuit board. In the present invention, the braking structure is modularized, which has good compatibility and is common in use, and can be mounted to a fan at the last step without the need of changing the original way of assembling the fan.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A braking structure for centrifugal fan, comprising:
   a fan unit including a fan frame having a shaft barrel perpendicularly provided therein and an impeller having a vertically extended shaft; the shaft being located in the shaft barrel with an end pivotally connected to the impeller and another end extended to form a shaft pivotal section; and
   a braking unit including a braking base and a braking module; the braking base being located at a bottom of the shaft barrel and being provided with at least one pawl; the braking module including a through slot for correspondingly engaging with the shaft pivotal section, so that the braking module is pivotally connected to the shaft; and
   the braking module further having at least one movable hook and at least one elastic element received therein; the movable hook being movably projected from or retreated into the braking module; and the movable hook being provided with a hooked portion corresponding to the pawl; and
   the elastic element being pressed against the movable hook to restrict the movable hook to one of the projected and the retreated position relative to the braking module.

2. The braking structure for centrifugal fan as claimed in claim 1, wherein the impeller rotating forward brings the braking module to rotate forward at the same time, and wherein the elastic element includes a locating ball connected thereto; the locating ball being elastically pushed by the elastic element to engage with a retaining recess provided on the movable hook when the impeller rotates forward, such that the movable hook is retained to the retreated position in the braking module.

3. The braking structure for centrifugal fan as claimed in claim 2, wherein the impeller rotating backward brings the braking module to rotate backward at the same time, causing the locating ball on the elastic element to separate from the retaining recess on the movable hook, such that the movable hook is allowed to project from the braking module with the hooked portion thereof being engaged with the pawl.

4. The braking structure for centrifugal fan as claimed in claim 3, wherein when the impeller changes from rotating backward to rotating forward again, the movable hook is pushed by an inclined surface of the pawl on the braking base to move back to its originally retreated position in the braking module.

5. The braking structure for centrifugal fan as claimed in claim 1, wherein the through slot on the braking module has a rectangular configuration.

6. The braking structure for centrifugal fan as claimed in claim 1, wherein the shaft pivotal section on the shaft of the impeller is a flat key.

7. The braking structure for centrifugal fan as claimed in claim 1, wherein the fan frame is a metal case.

8. The braking structure for centrifugal fan as claimed in claim 1, wherein the shaft barrel is internally provided with an upper and a lower bearing for holding the shaft in the shaft barrel.

9. The braking structure for centrifugal fan as claimed in claim 1, wherein the at least one movable hook is provided in pairs.

* * * * *